United States Patent [19]
Campbell

[11] 3,739,629
[45] June 19, 1973

[54] PSYCHROMETER AND METHOD
[75] Inventor: Eric C. Campbell, Providence, Utah
[73] Assignee: Wescor, Inc., Logan, Utah
[22] Filed: Feb. 9, 1971
[21] Appl. No.: 113,846

[52] U.S. Cl. ................................................. 73/77
[51] Int. Cl. .......................................... G01n 25/62
[58] Field of Search .................... 73/73, 76, 77, 338

[56] References Cited
UNITED STATES PATENTS
2,676,417  4/1954  Eitelund.................................. 73/76

OTHER PUBLICATIONS

Zollinger et al., "A Comparison of Water–Potential Measurements Made Using Two Types of Thermocouple Psychrometer in Soil Science," Vol. 102, No. 4, 1966, pg. 231–239.

Primary Examiner—Herbert Goldstein
Attorney—Lynn G. Foster

[57] ABSTRACT

Apparatus and method for use in the measurement of the water or solvent potential of selected samples. The apparatus utilizes a psychrometer principle, which, broadly speaking, relies upon comparison between wet and dry bulb temperatures in a controlled system for obtaining desired measurements. A thermocouple utilized in making psychrometer measurements is concealed within a small psychrometer chamber and is exposed to the sample during testing, being sealed from surrounding environment. The psychrometer chamber is formed by a sample holder and metal heat sink components respectively disposed above and below the sample holder and serve to achieve rapid thermal equilibrium. The interior water potential measuring apparatus including the thermocouple is also thermally insulated to minimize ambient temperature effects. Samples to be analyzed are placed within a cup of a disc-shaped sample holder resting in a slide which can be displaced from side-to-side to position the sample and sample holder medially within the measuring apparatus at the psychrometer chamber. The tightening of a screw insures that the psychrometer chamber is sealed from the surrounding environment, following which vapor pressure equilibration and temperature equilibrium result. A second thermocouple may be provided giving a temperature reading for use in analysis of the electrical output of the psychrometer thermocouple. The output of the psychrometer thermocouple is presented in usable information form at a microvoltmeter which comprises a readout device for the sampling psychrometer.

9 Claims, 10 Drawing Figures

PATENTED JUN 19 1973 3,739,629
SHEET 1 OF 3
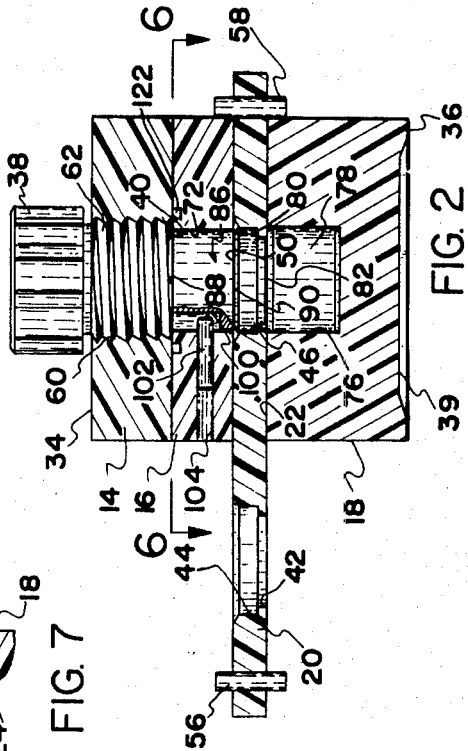
FIG. 6
FIG. 2
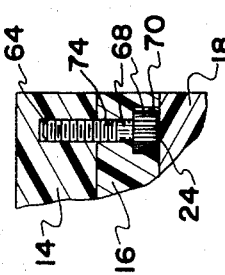
FIG. 7
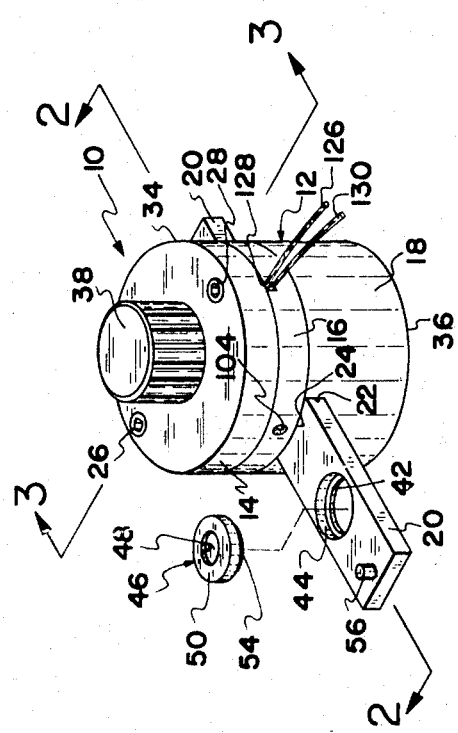
FIG. 1
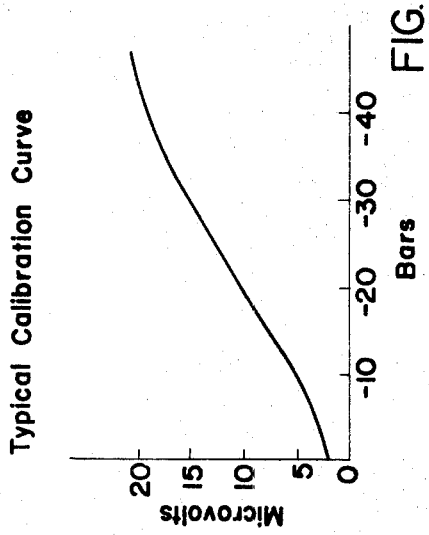
FIG. 10
Typical Calibration Curve
INVENTOR.
ERIC C. CAMPBELL
BY
*[signature]*
ATTORNEY

INVENTOR.
ERIC C. CAMPBELL
BY
ATTORNEY

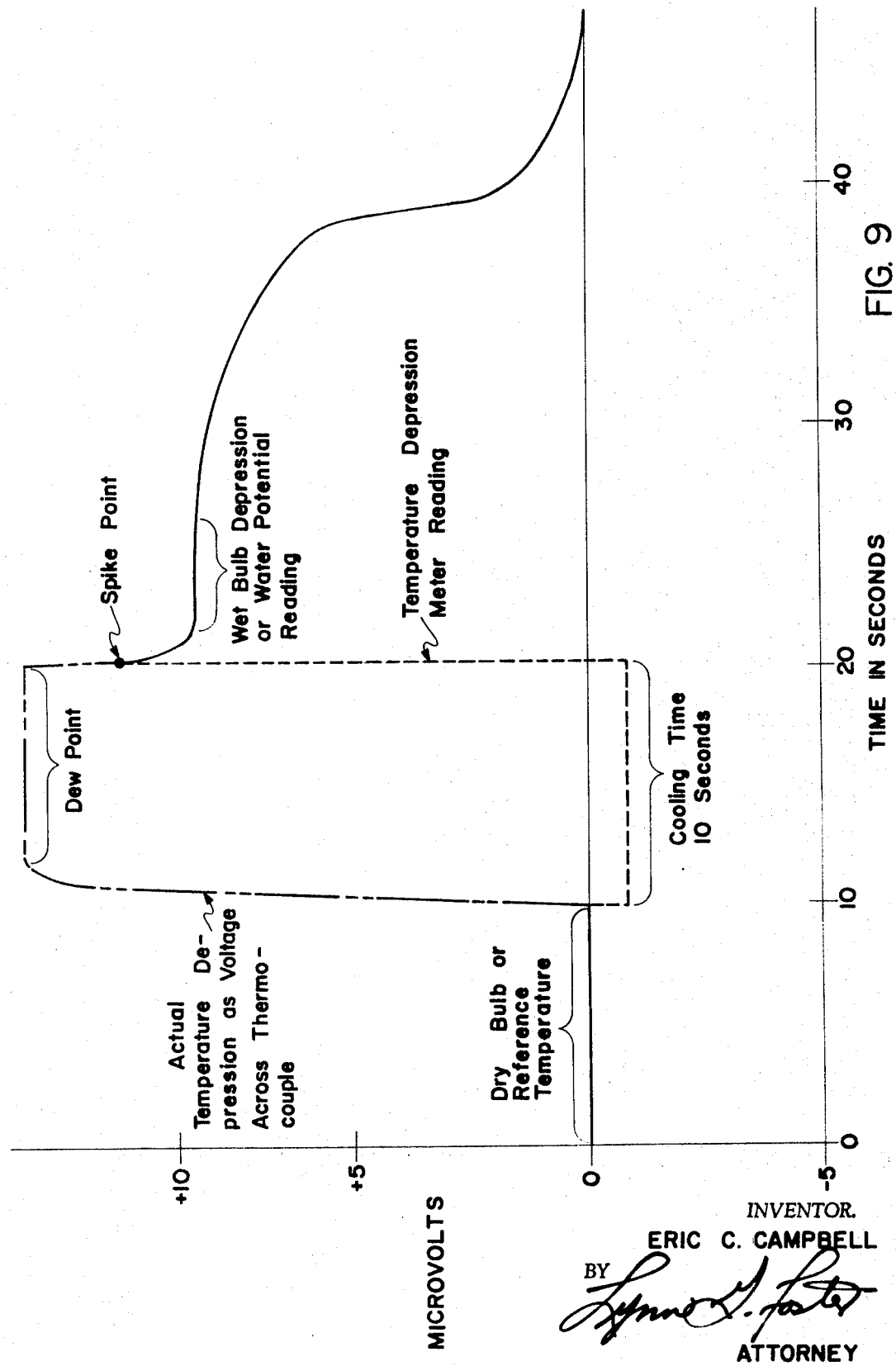

PSYCHROMETER AND METHOD

BACKGROUND

1. Field of the Invention

The present invention relates generally to the art of measuring water or solvent potential and more particulary to a novel Peltier thermocouple psychrometer apparatus and related methods for both field and laboratory use, the apparatus being used in conjunction with a read out device.

2. Prior Art

Psychrometers of the past have generally been of two types, wet loop psychrometers and Peltier thermocouple psychrometers, each type being relatively large and expensive and requiring precise control for satisfactory results. Where prior art psychrometers have been used under laboratory conditions, a carefully controlled temperature bath has been required, resulting in excessive time delay in reaching temperature and vapor pressure equilibrium in order to produce accurate readings. I am aware of the following prior art publications:

ZOLLINGER, W.C. et al. 1966. A Comparison of Water-Potential Measurements Made Using Two Types of Thermocouple Psychrometer. Soil Science Vol. 102, No. 4, pp. 231–239.

CAMPBELL, G.S. et al. 1966. Sample Changer for Thermocouple Psychrometers: Construction and Some Applications. Agronomy Journal Vol. 58, pp. 315–318.

CAMPBELL, G.S. et al. A Welding Technique for Peltier Thermocouple Psychrometers. pp. 1–6.

CALISSENDORFF, C. et al. 1970. Construction And Calibration Of An In Situ Leaf Psychrometer With Small Temperature Sensitivity. W-67 Regional Research Report. pp. 1–6.

RAWLINS, S.L. et al. 1967. Psychrometric Measurement of Soil Water Potential Without Precise Temperature Control. Soil Science Society of America Proceedings Vol. 31, No. 3 pp. 297–300.

RAWLINS, S.L. et al. 1968. In Situ Measurement of Soil and Plant Leaf Water Potential. Soil Science Society of America Proceedings Vol. 32, pp. 468–470.

DALTON, F.N. et al. 1968. Design Criteria For Peltier-Effect Thermocouple Psychrometers. Soil Science Vol. 105, No. 1 pp. 12–17.

RAWLINS, S.L. 1966. Theory For Thermocouple Psychrometers Used To Measure Water Potential In Soil And Plant Samples. Agricultural Meterology Vol. 3 pp. 293–310.

WIEBE, Herman E. et al. 1968 or later. Measurement of Water Potential Gradients in Trees. pp. 4–14.

SUMMARY AND OBJECTS OF THE PRESENT INVENTION

The present invention relates to a novel Peltier thermocouple psychrometer and methods for measuring water or solvent potential in the laboratory or in the field using a comparison of wet and dry bulb temperatures in a small test region of the psychrometer as a measurement of relative partial pressure of the gas form of the solvent or water on the wet bulb (thermocouple junction). The present Peltier thermocouple psychrometer comprises a slide bar capable of serially introducing samples contained within sample holders at spaced locations along the slide bar into the psychrometer or sample chamber, which is located between two heat sinks, without exposing the interior of the psychrometer including the sample chamber to surrounding environmental conditions. An "O" ring seal prevents such exposure and is flattened by force-applying structure so that the sample holder within the sample chamber and the two heat sinks becomes contiguous whereby uniform temperature conditions prevail inside the psychrometer. The exterior bottom surface of the psychrometer is recessed to minimize the impact of external temperature upon the psychrometer, while the sample holder within the sample chamber and two heat sinks are thermally insulated.

Accordingly, it is a primary object of the present invention to provide novel Peltier thermocouple psychrometers and related methods.

Another important object of the present invention is the provision for measuring water or solvent potential in the laboratory or in the field by comparison of wet and dry bulb temperatures in a small test region of the pyschrometer.

It is a further significant object of the present invention to provide an improved psychrometer which utilizes a slide and spaced sample holders carried by the slide, and accommodates serial introduction of the sample holders into the sample chamber without exposing the interior of the psychrometer to surrounding environmental conditions.

It is a further paramount object of the present invention to provide a novel psychrometer which serially comprises two heat sinks with a slide interposed between for introducing sample holders with samples therein into a sample chamber adjacent one heat sink.

A further important object comprises the provision of novel seal structure for preventing exposure of the sample chamber of a psychrometer during repeated testing of a plurality of samples.

Another significant object of this invention comprises the provision of force-applying structure to bring a sample holder and two heat sinks, one on each side of the holder, into contiguous relation to form a single thermal mass during testing.

Another principal object of the present invention is the provision of an improved psychrometer which is recessed at its exterior bottom surface to minimize environmental temperature effects upon the psychrometer.

These and other objects and features of the present invention will become more fully apparent from the following description and appended claims taken in conjunction with the accompanying drawings.

BRIEF DESCRIPTION OF THE DRAWINGS

FIG. 1 is a perspective view of a presently preferred apparatus according to this invention;

FIG. 2 is an enlarged cross section taken along the line 2—2 of FIG. 1;

FIG. 6 is a cross section taken along line 6—6 of FIG. 2;

FIG. 7 is a cross section taken along line 7—7 of FIG. 6;

FIG. 9 is one graphic representation of actual and meter-indicated temperature depressions across the psychrometer thermocouple; and FIG. 10 is typical calibration curve which can be used to convert a meter-indicated temperature depression to water or solvent potential for a given sample.

DETAILED DESCRIPTION OF THE ILLUSTRATED EMBODIMENT

General

Figure 8:
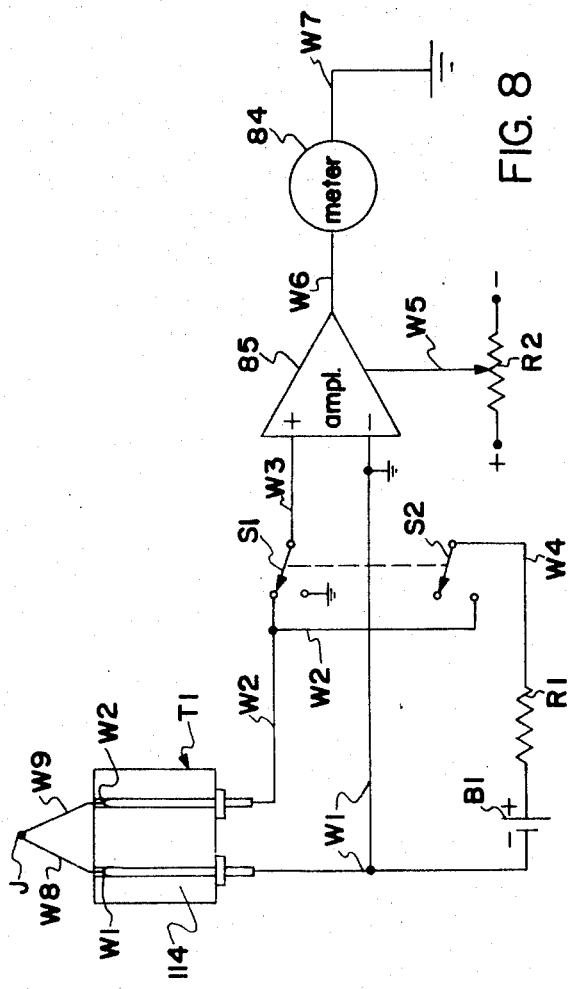
FIG. 8 is a diagram illustrating a presently preferred circuit of the present invention.

The sample chamber psychrometer, illustrated in the Figures and generally designated 10, comprises apparatus and accommodates methods relating to the use of the psychrometer principle in the measurement of the water or solvent potential of small samples, which may comprise aqueous or non-aqueous liquid, or any substance containing liquid, such as leaf specimens, soil specimens, medical solutions, any plant or animal tissue, etc., either in the laboratory or in the field, without the use of a constant temperature bath. Measurements are made by the psychrometer 10 and a read out is produced, as, for example, by a voltmeter 84 (FIG. 8). Samples are each placed in a sample holder 46 carried by a slide 20 and are successively introduced within a small psychrometer chamber 92 where the water or solvent potential is later measured. Heat sinks 86 and 78 are situated respectively above and below the holder 46 and together become a single thermal mass during testing providing for rapid thermal equilibrium. The psychrometer chamber 92 is entirely thermally insulated by the cylinder assembly 12 to minimize ambient temperature variations of the sample, the holder, and the heat sinks.

Figure 5:
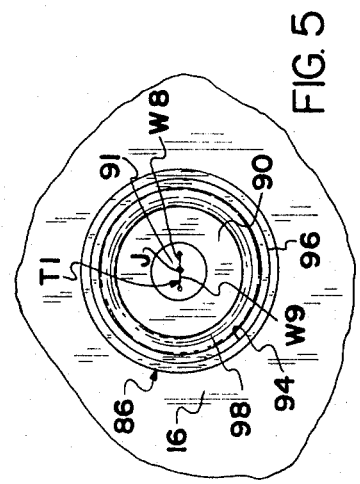
FIG. 5 is an enlarged view taken along the line 5—5 of FIG. 4, illustrating the upper heat sink assembly and the psychrometer thermocouple.
Figure 4:
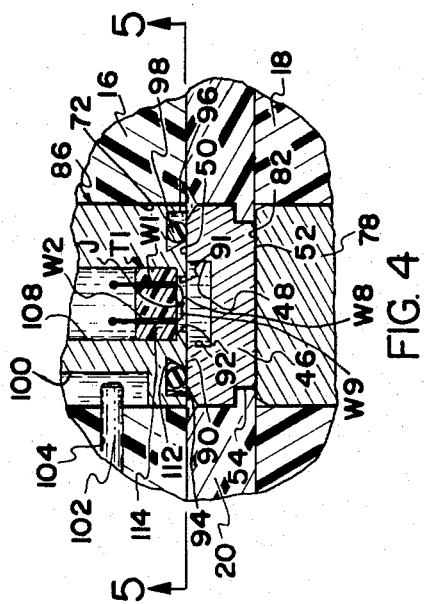
FIG. 4 is an enlarged fragmentary cross section illustrating the psychrometer chamber, the heat sink assemblies and the sample holder of the apparatus of FIG. 1.

The apparatus 10 provides for the sealing from surrounding environment of a concealed psychrometer thermocouple T1 (FIGS. 4, 5 and 8) and a sample and holder 46 within the psychrometer chamber 92. The thermocouple T1 is a chromelconstantan thermocouple enclosed within the psychrometer chamber 92. The apparatus 10 utilizes the mentioned psychrometer principle, which pertains to comparison between wet and dry bulb temperatures in a gaseous atmosphere of solvent or water as a measurement of the relative partial pressure of the gas form of the solvent or water on the wet bulb or thermocouple junction J (FIG. 8).

The present invention utilizes the Peltier effect. The Peltier effect may be defined as the absorption or liberation of heat at the thermocouple junction J caused when a controlled current flows across the junction J, which consists of dissimilar metals, the direction of the current flow controlling whether absorption or liberation of heat results and is proportional to the current flow.

The water or solvent potential, depending upon whether the liquid under consideration is aqueous or non-aqueous, may be defined as the amount of energy per unit mass of solvent required to remove pure solvent from the sample in question, and is usually measured in joules of energy per kilogram of water or solvent, as the case may be.

After allowing time for vapor pressure equilibration and temperature equilibrium within the chamber 92, a controlled current is caused to pass through the thermocouple T1 from the battery B1 in a direction such that the thermocouple T1 is cooled by absorption of heat, causing moisture to condense on the junction J. After a cooling period, switching of mechanically linked switches S1 and S2 is performed to halt the mentioned current flow through the thermocouple T1. The mentioned switching also connects the outputs of the thermocouple T1 at wires W1 and W2 through the amplifier 85 to a voltmeter 84, which measures the electromotive force output from the junction. The electromotive force output, in voltage units, is proportional to the rate of evaporation at the thermocouple junction J. The rate of evaporation is a function of the water or solvent potential of the sample and can be determined according to available calibration curves, which will be discussed in greater detail hereinafter.

Structure

The osmometer or psychrometer 10 is made up of a cylindrical assembly 12, preferably of nylon material, comprised of three cylindrical wafers, i.e. an upper wafer 14, a center wafer 16, and a lower wafer 18. A slide 20, also preferably of nylon, is received through a slot or notch 22 in the top surface of the lower wafer 18 immediately vertically below and adjacent the lower edge or face 24 of the middle wafer 16. A nylon or like screw 38, with a knurled top, is threadedly received at threads 62 of the upper wafer 14. The cylindrical assembly 12 thermally insulates the interior of the psychrometer.

Figure 3:
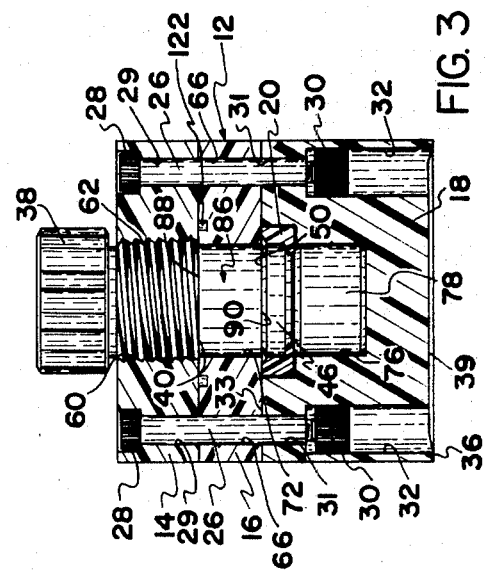
FIG. 3 is an enlarged cross section taken along the line 3—3 of FIG. 1.

The three wafers 14, 16 and 18 are connected together by two socket head screws 30 (FIG. 3) which are respectively recessed in a counterbore 32 in the bottom of the lower wafer 18 and extend vertically upward screwing into an interiorly threaded insert or retainer 26. Each insert 26 is in turn recessed in a counterbore 28 in the top of the upper wafer 14 and extends downward therefrom through aligned bores 29, 66 and 31 of wafers 14, 16 and 18, respectively. The upper wafer 14 is also independently connected to the middle wafer 16 by two socket head screws 68, each of which is recessed into a counterbore 70 in the bottom of the middle wafer 16 and engages the threads of a bore 64 in the upper wafer 14. The threaded part of each screw 68 passes loosely through a bore 74 in the middle wafer 16.

The upper wafer 14 has a large, centrally threaded bore 60 which receives the threaded portion 62 of the nylon screw 38. The lower wafer 18 is constructed with a central recess 39 adjacent its lower edge 36 avoiding a large area of contact with the supporting surface to minimize heat conduction. The slide 20, which is slideably received betweeen the lower edge 24 of the middle wafer 16 and the slot 22 in the top surface 33 of the lower wafer 18, can be manually moved from side to side through the slot 22, the limits being determined by the stop pins 56 and 58 respectively carried by the slide 20 at opposite ends thereof. The slide 20 is shown as having two apertures 44, each comprising a lower lip 42 so as to receive and contain a sample holder 46 therein. Preferably, each sample holder 46 is of brass material coated with a corrosion resistance material, such as stainless steel. If desired, the slide can be of greater length and can comprise several more apertures for receiving sample holders. When the slide 20 is in one extreme position, one stop 56 or 58 is against the cylindrical assembly 12 and the sample holder 46 in one aperture 44 is positioned in the center of the cylindrical assembly 12 as shown in FIG. 2. With the sample holder 46 in the position of FIG. 2, the sample holder 46 is directly above a heat sink 78 preferably of brass which rests in a blind bore 76 in the lower wafer 18. The lower surface 52 of the sample holder 46 is contiguous with the upper surface 82 of the heat sink 78. Positioned vertically above the sample holder 46 is a generally cylindrical heat sink and thermocouple assembly 86, which is inserted into a central bore 72 of the middle wafer 16. The upper surface 88 of the upper heat sink and thermocouple assembly 86 is adjacent to the lower surface 40 of the nylon screw 38. The lower surface 90 of the heat sink assembly 86 is adjacent the upper surface 50 of the sample holder 46.

As mentioned, the upper heat sink and thermocouple assembly 86 is received within the bore 72 of the center wafer 16 in vertically slideable relation, being limited in its vertical movement by a guide pin 102 (FIGS. 2 and 4) which secured in press-fit relation in a transverse bore 104 in the center wafer 16 and extends transversely into the bore 72 where it fits into a longitudinal slot 100 in the outside casing, which is preferably brass, of the heat sink and thermocouple assembly 86. Thus, the heat sink assembly 86 is retained within the bore 72 between the pin 102 and the sample holder 46.

The lower portion 96 (FIGS. 4 and 5) of the upper heat sink and thermocouple assembly 86 is constructed with a very shallow recessed center cavity 91 in which the psychrometer thermocouple T1 is mounted. The chromel and constantan leads or wires W8 and W9, usually having diameters of about 0.001 of an inch, of the thermocouple T1 extend downwardly into the cavity 91 through a block of material 114 in the center bore 108 of the heat sink and thermocouple assembly 86 and are joined together, as by soldering or welding, at junction J, normally of spherical configuration and about seven times the diameter of the wires W8 and W9. Thermocouple wires W8 and W9 are respectively electrically joined to wires W1 and W2, preferably of copper material. The thermocouple T1 is, therefore, mounted within the center bore 108 by the structure 114, such as Teflon, press-fit in place, through which the wires W1 and W2 extend and which defines the top of the shallow cavity 91.

The leads W1 and W2 extend from the thermocouple T1 upwardly through the structure 114 and are thereafter packaged together within a sheath 126 in electrically insulated relation one to the other. The sheath 126 extends from the center aperture 108 (FIG. 6) through a radial slot 110 in the heat sink and thermocouple assembly 86. Immediately adjacent the slot 110 at the junction of the heat sink and thermocouple assembly 86 and the bore 72 of the middle wafer 16 is a slot 124 in wafer 16 which comprises a linear extension of slot 110 through which the sheath 126 is passed to an annular channel 122 which loops around the heat sink and thermocouple assembly 86, being concentric thereto. The sheath 126 is placed in the channel 122 and traverses approximately 360° before extending through a radial slot 128 which is situated in the wafer 16 between the channel 122 and the exterior surface of the wafer 16. The sheath 126 is placed in channel 122 in order to minimize heat conduction to or from the thermocouple T1.

A second thermocouple T2 (FIG. 6), which may but need not be used, measures the temperature at the interior of the psychrometer and is inserted in contiguous relation with the heat sink and thermocouple assembly 86 at the slot 110. Cable 130, which comprises two electrically insulated wires connects to the temperature thermocouple T2 and is confined within slots 110 and 124, channel 122 and slot 128 in the same manner as described in conjunction with sheath 126.

An "O" ring 98 (FIG. 4) is disposed in an annular groove 94 of end portion 96 of the assembly 86 and is there retained by a sloping or beveled lip 112. As the slide 20 is displaced, the "O" ring 98 will create a seal against the top surfaces of the slide and sample holder to prevent exposure of the interior of the psychrometer to surrounding environmental conditions. The "O" ring is firmly pressed against the top surface 50 of the sample holder 46 and creates a seal therewith when one sample holder is aligned with the chamber 91.

As earlier mentioned, the upper surface 88 of the heat sink and thermocouple assembly 86 is vertically below and adjacent the lower surface 40 of the screw 38. Consequently, the heat sink and thermocouple assembly 86 is pressed downward when the screw 38 is tightened, causing the "O" ring 98 to be flattened. This causes the bottom surface 90 of assembly 86 to firmly contact the top surface 50 of the sampler holder. At the same time, the bottom surface 52 of the sample holder 46 is firmly contiguous with the top surface 82 of the heat sink 78. Consequently, the sample chamber 92 is firmly sealed and the heat sinks 78 and 86 and the sample holder 46 comprise a single thermal mass.

If desired, the details of the described embodiment as illustrated in the figures may be altered without departing from the spirit of the present invention. For example, as mentioned, a slide having a plurality of apertures 44 in excess of two arranged in a continuous row could be utilized. In this way a series of samples can be successively processed into a psychrometer or sample chamber for testing, by moving such slide in a single direction, a given distance for each sample, without exposure of the interior of the psychrometer to outside environmental conditions.

Electrical

Reference is now made to FIG. 8, which illustrates presently preferred circuitry for the described circuitry. FIG. 8 schematically shows the mentioned chromel-constantan thermocouple T1. The negative pole of a D.C. battery B1 is connected by a wire W1 to the chromel lead W8 of the psychrometer thermocouple T1, which chromel lead W8 terminates at junction J. Wire W2 connects to the constantan lead W9, which also terminates at junction J. The lead W1 is also connected to the negative input terminal of amplifier 85. Wire W2 is connected to one terminal each switch S1 and S2, as can be readily observed by inspection of FIG. 8.

Wire W4 connects the positive pole of the D.C. battery B1 across resistor R1, which serves to control the rate at which current is permitted to pass across switch S2 to the thermocouple T1. When switches S2 and S1, which are mechanically linked together, are in their down positions as illustrated in FIG. 8, current will be passed across resistor R1, along wire W4, across switch S2, along wires W2 and W9 to the junction J, resulting in cooling of the junction J. This is the "cooling mode."

When the linked switches S1 and S2 are in their up position, power from the battery B1 is not permitted to reach the thermocouple T1 because of the open condition of switch S2, while any electromotive force produced at junction J is communicated along wires W9 and W2 across switch S1 and along wire W3 to the positive input of the amplifier 85. This is the "read mode."

The output of the amplifier 85 is connected by wire W6 to a microvoltmeter 84, which is grounded by wire W7, the meter providing an appropriate read out of the mentioned electromotive force in microvolts. Of course, other output devices part from voltmeters could be used for the indicated purpose. For example, a suitable recorder could be used to provide a permanent record of such electromotive force.

As hereinafter more fully explained the meter 84 is initially set at zero by adjusting the zero offset resistor R2, which is the control input to the amplifier 85.

Operation

The operation of the psychrometer 10 and related circuitry will now be explained. One sample holder 46 is placed in a selected aperture 44 of the slide 20 and a sample is preferably thereafter placed in the sample cavity 48 of the sample holder 46. The sample holder 46 is then located immediately below the thermocouple T1 in sample chamber 92 by appropriate linear manual displacement of the slide 20 in respect to the cylindrical assembly 12. The chamber 91 must be clean for proper operation and testing. The screw 38 is then tightened into the upper wafer 14 displacing the upper heat sink and thermocouple assembly 86 downwardly, causing the "O" ring 98 to be flattened while maintaining its seal against the upper surface 50 of the sample holder 46 and causing the two heat sinks to be firmly contiguous with the top and bottom respectively of the sample holder so that one thermal mass is formed as previously mentioned. With the switches S1 and S2 in their up position, the electromotive force produced at junction J is communicated to the positive input of amplifier 85. This measurement immediately upon placing a sample within the chamber 92 is the dry bulb temperature. This condition is maintained after the sample holder and sample are properly inserted into chamber 92 until temperature equilibrium and vapor pressure equilibration result in the sample chamber 92. These conditions become known to the operator when the meter reading becomes constant. At this time, the meter 84 is zeroed by use of the zero offset control R2 (FIG. 8), which is connected to the amplifier by wire W5. The switches S1 and S2 are placed in their down or cooling mode positions, as illustrated in FIG. 8. This opens the circuit between the thermocouple T1 along wires W2 and W3 to the amplifier and causes a controlled current to flow from constantan wire W9 to chromel wire W8 across junction J. This causes the junction J to cool, resulting in the condensation of water or solvent on the surface of the junction J.

Later, the mentioned current flow through the thermocouple T1 is discontinued when the switches S1 and S2 are placed in their up positions as viewed in FIG. 8. Switch S2 is then open, breaking the circuit between the battery B1 and the junction J, and switch S1 is then closed, completing the circuit from the junction J across constantan wire W9 of the thermocouple T1 along wire W2 to the positive input of the amplifier at wire W3. Immediately after the switches S1 and S2 have been changed, cooling at the junction J stops and the temperature of the thermocouple T1 is different in respect to its original temperature only by a factor related directly to the rate at which water or solvent is evaporating from the junction J. The temperature of the thermocouple T1 is read by measuring its electromotive force in terms of voltage from the amplifier 85 at the meter 84 and is a measure of the rate at which water or solvent is evaporating from the surface of the junction J, which is directly related to the osmolality of the sample. In the read mode, the voltage across thermocouple is proportional to the temperature difference between the junction J and the average of the junctions between wires W1 and W8 and W2 and W9, respectively. After all the water or solvent on the surface of the junction J has evaporated it will return to its original temperature.

In respect to the graph of FIG. 9, explanation will be made as to various meter readings produced during testing of a given sample, the appropriate portion of such readings, which is classified as an accurate measure of the electromotive force produced at junction J in the manner previously described, and the relationship of meter-indicated voltage as opposed to actual temperature depression in terms of voltage across the thermocouple. The graph of FIG. 9 is in combination (a) a representation of the actual temperature depression occuring across the thermocouple T1 during a complete test cycle and (b) a representation of the temperature depression as indicated on the voltmeter 84.

The phantom line, as shown on the graph of FIG. 9, is a representation of the actual temperature depression as a voltage across the thermocouple T1 during a complete test cycle. At thermal equilibrium and vapor pressure equilibration in the psychrometer chamber or sample chamber 92, the actual temperature depression is zero. Thermal equilibrium and vapor pressure equilibration time may vary considerably depending upon temperature conditions, the nature of the sample in question and other factors. For example, equilibration over leaves, normally obtained with a paper punch, and other similar samples may be slow requiring as long as 15 minutes, while soil and larger samples sometimes require on the order of two or three minutes. Equilibration is much faster where solutions are being tested, it being normal practice to saturate a filter paper disc with the solution and thereafter place the disc in the sample-receiving cup of the sample holder 46. Immediately upon initiation of the cooling cycle, the current flow across the thermocouple T1 from constantan to chromel produces a rapid cooling which changes the actual temperature depression in terms of voltage markedly as shown by the vertical jump in the phantom representation of FIG. 9. The actual temperature depression reaches a ceiling when the dew point is reached, i.e. a point in time when conditions in the psychrometer chamber 92 commence to produce condensation at junction J. This ceiling is identified as "Dew Point" on the graph of FIG. 9.

Sometime after the dew point is reached, switches S1 and S2 are shifted to the up position, as illustrated in FIG. 8, causing a reduction in the temperature depression across the thermocouple as cooling at junction J is discontinued and evaporation commences. Consequentially, there is a sharp drop in temperature depression in terms of voltage across the thermocouple, which is illustrated in FIG. 9 as that portion of the phantom line immediately above the "Spike Point."

During cooling, the switches S1 and S2 are in their down positions, as illustrated in FIG. 8, and the mentioned electromotive force is no longer communicated to meter 84. As a result a meter reading corresponding to the amplifier output with the amplifier inputs grounded results, shown on FIG. 9 as being negative for illustrative purposes and existing between the 10 and 20 second interval of time. During this period of time as previously mentioned, the positive pole of the battery is in electrical communication with the thermocouple T1 and cooling and condensation at the junction J is occurring. While a cooling interval of 10 seconds is illustrated in FIG. 9, it is to be appreciated that, depending upon temperature, sample conditions and other factors, shorter or longer intervals may be required.

With continued reference to FIG. 9, following adequate cooling time as previously indicated, switches S1 and S2 are again positioned in their up dispositions as shown in FIG. 8, resulting in a sharp jump in the temperature depression meter reading, the jump being shown as the vertical dotted line in FIG. 9. At this point, the previously mentioned actual temperature depression across the thermocouple becomes the temperature depression meter reading and is illustrated in FIG. 9 as the "Spike Point."

Thereafter, as illustrated on the portion of the graph seen to the right of the Spike Point, the actual temperature depression across the thermocouple is also the temperature depression meter reading. After the peak spike voltage is dissipated, a plateau output results, which is identified in FIG. 9 as the wet bulb depression or water (solvent) potential reading. During this interval, the operator of the psychrometer 10 records the essentially constant reading on the voltmeter, following which the meter reading proceeds to decrease as shown by the remainder of the curved line to the right in FIG. 9, ultimately returning to zero.

Once the wet bulb depression or water (solvent) potential read out has occurred for a given sample in the manner indicated above, this value is used in conjunction with a suitable calibration curve (see FIG. 10) to arrive at a corresponding "bar" value (one bar equals 100 joules/kilogram), which constitutes the water or solvent potential of the sample under consideration. Suitable calibration curves are formulated by placing a solution of known water or solvent potential in the psychrometer 10 and obtaining voltage outputs at selected temperature for the specific solution. Thus, for a given temperature, the relationship between voltage and water potential becomes a known empirical relationship which can be graphically produced in the manner shown in FIG. 10 for the particular substance under consideration. Thereafter, by knowing the substance of a smaple being investigated, the temperature within the sample chamber 92 and the meter reading, the water potential in bars can be readily ascertained from an appropriate calibration curve.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

I claim:
1. A psychrometer comprising:
a rigid casing of material having good thermal insulation characteristics;
heat sink means disposed within the casing;
a transverse slot disposed through the heat sink means;
a peltier thermocouple disposed immediately adjacent the transverse slot with the junction of the thermocouple disposed in a chamber which opens directly to the transverse slot;
slider means reciprocably situated in the transverse slot for moving samples into alignment with the chamber and for removing samples from the psychrometer;
means sealing the sample of external environmental conditions at least when the sample is situated in alignment with the chamber;
the heat sink means comprising two parts, one on each side of the transverse slot;
the slider means comprises a slide bar by which at least one sample holder is carried;
the sample holder and the heat sink means having good thermal conducting properties;
the sealing means comprises an "O" ring interposed between one heat sink part and one surface of the slider means;
the sealing means further comprising force-applying means for compressing the two parts of the heat sink means and the sample holder together counter to the memory of the "O" ring, creating a single thermal mass from the three mentioned components.

2. A peltier psychrometer for measuring water and solvent potential of a plurality of samples comprising:
a casing comprising thermal insulating material;
a heat sink mass and peltier thermocouple means situated within the casing;
slider means extending through the casing and heat sink mass in slideable relation, the junction of the thermocouple being exposed to part of the slider means within the heat sink mass;
means creating and maintaining a sealed relation between the slider means and the heat sink mass to isolate the thermocouple junction and the adjacent portion of the slider means from external environmental conditions;
slider means comprising a carrier and spaced sample holders situated in alignment along the carrier, whereby the sample holders may be serially moved from the environment external to the psychrometer to a position adjacent the junction for testing purposes without at any time exposing the junction to external environmental conditions.

3. A psychrometer comprising:
a thermal insulating rigid casing;
thermally conductive heat sinks situated within the casing such that a space exists therebetween;
the heat sinks being relatively reciprocable within limits one in respect to the other;
one heat sink having a moisture-detecting peltier thermocouple associated therewith such that the junction of the thermocouple is exposed at the sapce between the heat sinks;
means for introducing a thermally conductive sample holder between the heat sinks so that a sample associated, with the sample holder is positioned directly adjacent the junction of the thermocouple;
means for forcing the heat sinks into firm contiguous relation with the sample holder thereby creating a single thermal mass to insure rapid thermal equilibrium.

4. A psychrometer as defined in claim 3 further comprising an anular seal interposed between one heat sink and the introduced sample holder to create a sealed relation therebetween.

5. A psychrometer as defined in claim 3 wherein the thermocouple junction is disposed within a small cavity existing at the one heat sink.

6. A peltier psychrometer assembly comprising:
a casing having thermal insulating properties serially comprising a first end portion, an intermediate portion and a second end portion, secured together in aligned and contiguous relation by fastener means;
one thermally conductive heat sink being rigidly held in an internal blind bore of one end portion of the casing;
an opening disposed at the interface between the one end portion and the intermediate portion of the casing, the one heat sink being exposed at the opening;
means displaceably situated in the opening for introducing thermally conductive sample-confining holders within the casing at the interface;
a second heat sink being reciprocably carried within a central bore of the intermediate portion of the casing in exposed relation to the opening;
a peltier thermocouple held centrally within the second heat sink, the junction of the thermocouple being exposed adjacent the opening;
force-applying means centrally carried by the other end portion of the casing urging the second heat sink toward the opening, causing the heat sinks to respectively be contiguous with a sample-confining holder disposed at the interface.

7. A psychrometer as defined in claim 6 further comprising an annular seal interposed between the second heat sink and the sample-confining holder disposed at the interface.

8. In a method of measuring water and solvent potential of samples, the steps of:
transversely introducing one sample disposed within one sample carrier carried by a slide mechanism from outside a peltier psychrometer into a sample chamber of the psychrometer by displacement of the slide mechanism while maintaining the sample chamber and slide mechanism at the sample chamber sealed from the environment outside the psychrometer, the junction of the thermocouple of the psychrometer being exposed within the sample chamber;
testing the sample by use of the thermocouple to obtain a measure of the water or solvent potential of the sample; and
transversely introducing a second sample disposed in a second sample carrier carried by the slide mechanism from outside the psychrometer into the sample chamber and simultaneously removing the one sample and the one sample carrier from the sample chamber to a position outside the psychrometer by displacement of the slide mechanism while maintaining the sample chamber and slide mechanism at the sample chamber in said sealed condition.

9. In a method of measuring water and solvent potential of a sample, the steps of:
placing a sample holder with the sample within a test chamber of a psychrometer where the junction of a peltier thermocouple is exposed to the sample by moving carrier means which hold a plurality of spaced samples in respect to the thermocouple;
creating and maintaining a seal against the carrier means between the test chamber and the external environment enabling successive delivery of samples to the test chamber by periodic displacement of the carrier means without exposing the junction to external environmental conditions;
isolating the sample within the test chamber;
allowing thermal equilibrium and water or solvent pressure equilibration to occur within the test chamber;
measuring the dry bulb electromotive force at the junction of the peltier thermocouple;
subjecting the junction of the thermocouple to peltier cooling, causing condensation of water or solvent at the junction;
terminating the peltier cooling;
measuring the wet bulb electromotive force at the junction once constancy is reached;
determining the difference between the dry and wet bulb electromotive forces at the junction in the isolated gaseous atmosphere of the test chamber as a measure of the relative partial pressure of the gas form of the water or solvent.

* * * * *